Jan. 12, 1932.  C. H. GUNN  1,840,898

RESILIENT RAIL CAR WHEEL

Filed May 11, 1931

INVENTOR

*Chas H. Gunn*

BY *Perry S. Webster*

ATTORNEY

Patented Jan. 12, 1932

1,840,898

UNITED STATES PATENT OFFICE

CHARLES H. GUNN, OF BURLINGAME, CALIFORNIA

RESILIENT RAIL CAR WHEEL

Application filed May 11, 1931. Serial No. 536,403.

This invention relates to railway or street car wheels, my principal object being to provide a wheel of this character so constructed that a considerable of the noise incident to its operation over the rails will be eliminated, and the jarring and bumping shocks now imparted to the car and its occupants as the wheels pass over switches, frogs and crossings will be absorbed to a great degree.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
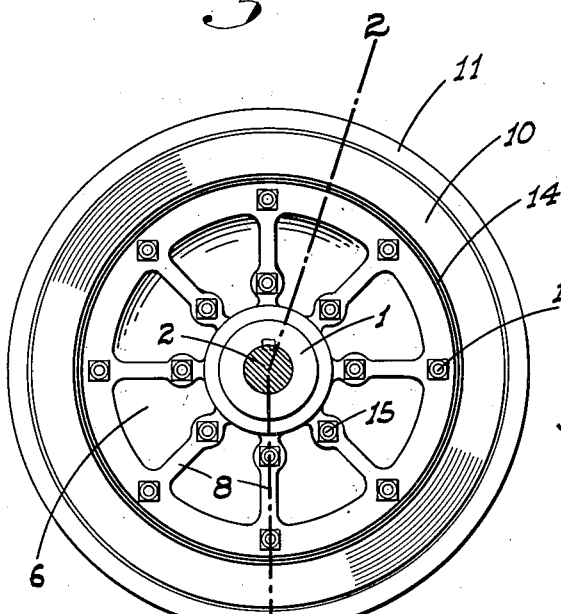
Fig. 1 is an outside view of my improved wheel.
Figure 2:
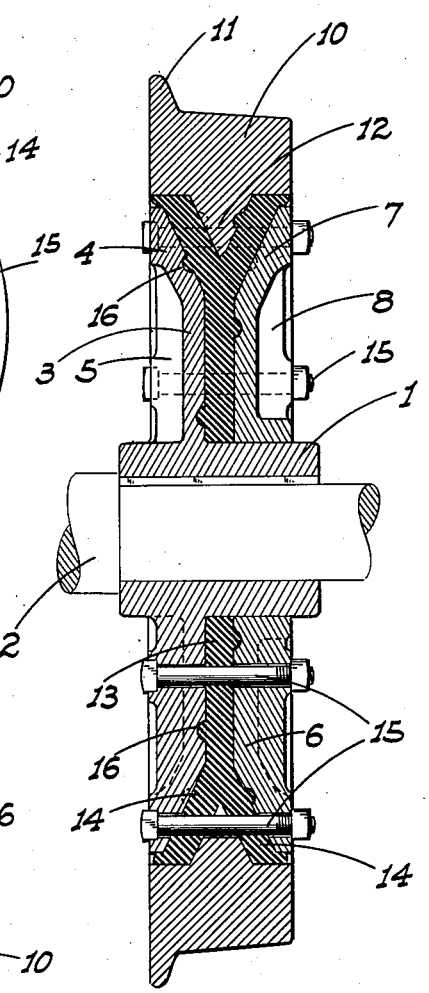
Fig. 2 is a cross section of the wheel taken on the line 2—2 of Fig. 1.
Figure 3:
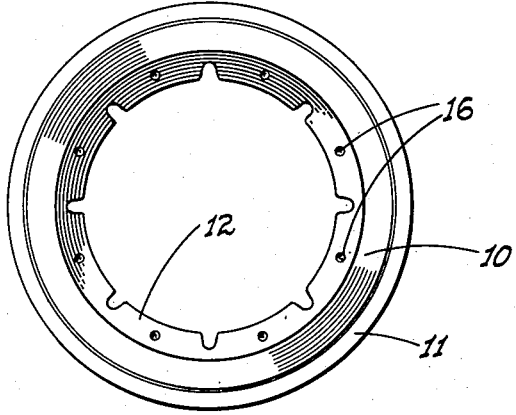
Fig. 3 is an outside view of the tire or rim member of the wheel detached.

Referring now more particularly to the characters of reference on the drawings, the wheel comprises a hub portion 1 on which the axle 2 is rigidly secured as usual. Projecting outwardly from the hub towards its inner end and formed integral therewith is a disc-web 3, having a backwardly flaring shoulder 4 towards and extending to its outer periphery. Radial ribs 5 on the back of the web strengthen the same.

Another similar shaped web 6 is slidably mounted on the hub from the front of the same, this web having a forwardly flaring shoulder 7 toward its outer periphery and disposed symmetrically to the shoulder 4. The shoulders therefore form in effect a relatively deep V-shaped groove extending continuously about the circumference of the wheel inwardly of the tire or rim. The web 6 also has radial strengthening ribs 8 on its outer or front face. Disposed outwardly of the webs and separate therefrom is a rim or tire 10 of the wheel having the usual rail engaging flange 11. This rim is thick enough so that it has no tendency to spring or collapse. At its inner periphery and between its front and back edges the rim is formed with an inwardly projecting V-shaped rib 12 which extends all around the rim and projects between the shoulders 4 and 7 in parallel but spaced relation thereto; the webs 4 and 6 being also spaced apart transversely of the wheel.

Disposed in the spaces thus formed between the webs and the rim-rib is a filler disc of resilient rubber. This disc comprises a main flat portion 13 which is disposed between the adjacent parallel faces of the webs, and lateral extensions or flange portions 14 projecting between the rib 12 and the web shoulders as plainly shown. The filler is therefore Y-shaped in cross section and is initially considerably thicker than the spaces it is to fill.

In assembling the parts of the wheel the resilient filler is preferably placed in position on the rim first. The rim and filler as a unit is then slid onto the hub so that the filler abuts against the back web 3. The front web 6 is then applied and the webs are connected together by radial spaced rows of bolts 15 which project through the webs and the filler; the outer row of bolts also project through the rib 12. Of course it is to be understood that all the parts are provided with holes to receive the bolts, which must be lined up with each other when said parts are assembled. The bolt holes or slots in the rib 12 are oversize, so as to permit of the necessary resilient movement between the rim and the other parts of the wheel.

The filler being confined between the webs is of course clamped in place therebetween, and the bolts are tightened up sufficiently to compress said filler somewhat or so that it is relatively firm and rigid. In doing this the rubber enters and fills recesses or sockets 16 which are formed in the rib 12 and the adjacent faces of the webs at intervals, so as to aid in preventing rotation of the filler relative to the other parts.

It will thus be seen that the rim portion of the wheel is cushioned from the remainder and is free to yield both transversely and radially to a limited extent or sufficient to absorb shocks which would otherwise be transmitted to the hub and axle. The presence of the filler of this nature independent of any such yielding movement will of course serve to deaden noise to a great extent. Apart from these features, re-turning of the rim or tire when necessary is also facilitated, since it is no longer necessary to remove the wheel from the axle, or to do this work with both wheels and their axle removed from the vehicle as a unit, as is now customary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A rail car wheel comprising a central hub portion, a separate rail engaging rim portion, a web projecting outwardly from and rigid with the hub, a rearwardly flaring shoulder around the outer periphery of the web, another web slidably mounted on the hub in spaced relation to the first web and having a forwardly flaring shoulder around its outer periphery, said shoulders being disposed in symmetrical V-shaped relation to each other, a rib about the inner periphery of the rim to fit between the shoulders in spaced relation thereto, and a resilient filler member disposed between the webs and having lateral branches projecting between the shoulders and the corresponding faces of the rib.

2. A rail car wheel comprising a central hub portion, a separate rail engaging rim portion, a web projecting outwardly from and rigid with the hub, a rearwardly flaring shoulder around the outer periphery of the web, a V shaped rib projecting inwardly from the rim and extending all about the same, the shoulder extending along side one face of said rib in spaced relation thereto, a resilient disc abutted against the web and having extensions to engage the rib on opposite sides, and means to engage and clamp the disc in place against the web and rib.

3. A wheel comprising a central hub portion, a rim portion separate therefrom, a continuous resilient cushion between and engaging said portions, the cushion engaging faces of the portions having depressions therein at intervals, and projections on the cushion filling said depressions.

In testimony whereof I affix my signature.

CHARLES H. GUNN.